United States Patent [19]
Kightlinger et al.

[11] Patent Number: 5,886,124
[45] Date of Patent: Mar. 23, 1999

[54] LIQUID-ABSORBENT POLYMER AND GELATINOID PRODUCT

[75] Inventors: Adrian P. Kightlinger, Muscatine, Iowa; Richard L. Antrim, Solon, Iowa

[73] Assignee: Grain Processing Corporation, Muscatine, Iowa

[21] Appl. No.: 72,977

[22] Filed: May 5, 1998

[51] Int. Cl.⁶ .................................................. C08G 83/00
[52] U.S. Cl. ..................... 527/312; 527/313; 527/314; 527/315
[58] Field of Search .................................... 527/312, 313, 527/314, 315

[56] References Cited

U.S. PATENT DOCUMENTS

| | | |
|---|---|---|
| 3,661,815 | 5/1972 | Smith . |
| 4,069,177 | 1/1978 | Smith . |
| 4,155,888 | 5/1979 | Mooth .................................... 527/314 |
| 4,301,017 | 11/1981 | Kightlinger et al. . |
| 4,375,535 | 3/1983 | Kightlinger et al. . |
| 4,558,100 | 12/1985 | Kightlinger et al. . |
| 4,579,944 | 4/1986 | Harvey et al. . |
| 4,769,414 | 9/1988 | Kightlinger et al. . |

OTHER PUBLICATIONS

Brandrup et al., eds, Polymer Handbook, Third Edition, John Wiley & Sons, Inc. pp. VI/438–439, 1989.

*Primary Examiner*—Nathan M. Nutter
*Attorney, Agent, or Firm*—Leydig, Voit & Mayer, Ltd.

[57] ABSTRACT

Disclosed are a liquid-absorbent polymer and a substantially clear gelatinoid product. The liquid absorbent polymer comprises a saponified graft copolymer of starch and a polynitrile species, such as polyacrylonitrile. In accordance with the disclosed invention, the liquid-absorbent polymer is prepared from a derivatized starch, the derivatized starch having a degree of substitution sufficient to substantially inhibit starch-starch interactions in the gelatinoid product formed upon mixing of the polymer with liquid. Preferred starches have a degree of substitution (DS) of at least about 0.01. Upon saponification of the liquid-absorbent polymer and placing of the polymer into absorbent contact with a liquid, a gelatinoid product will be formed. The gelatinoid product thus formed will have a substantially homogeneous index of refraction, and thus will be substantially clear.

48 Claims, No Drawings

LIQUID-ABSORBENT POLYMER AND GELATINOID PRODUCT

TECHNICAL FIELD OF THE INVENTION

The invention is in the field of liquid-absorbent materials, such as those known in the art as "superabsorbent" polymers. More specifically, the invention is directed towards starch-based liquid-absorbent materials.

BACKGROUND OF THE INVENTION

Substances which are capable of absorbing large amounts of liquids are known in the art. Such substances have many uses; for example, such substances can be used in manufacturing products such as disposable paper pads having enhanced water absorbency. Such liquid-absorbing substances also find utility in the manufacture of products used to absorb bodily fluids, including such products as diapers, sanitary napkins, protective bedpads, and so forth.

Superabsorbent materials are a particularly preferred class of liquid-absorbing materials. A superabsorbent material, or "superabsorbent," may be characterized as a material that absorbs at least about twenty times its own weight of an aqueous liquid, such as water or bodily fluid. Superabsorbents do not dissolve in the liquid, and tend to retain their general shape regardless of the amount of liquid absorbed. Upon absorbent contact with a liquid, a superabsorbent will swell to its equilibrium volume, and will have sufficient physical integrity to resist flow and fusion with neighboring superabsorbent particles or structures. When liquid is absorbed by the superabsorbent, a gelatinoid product will be formed.

The prior art has provided a number of superabsorbent materials having excellent properties for use in a variety of applications. For example, as taught in U.S. Pat. No. 3,661, 815, issued to Theodore Smith and assigned to Grain Processing Corporation, Muscatine, Iowa, the prior art has provided alkali methylcarboxylate salts of starch-acrylonitrile graft copolymers that are capable of absorbing water in amounts in excess of fifty parts per part thereof. Such polymers may be prepared by the graft copolymerization of an acrylonitrile polymer with starch, as taught, for example, in U.S. Pat. No. 4,069,177, issued to Theodore Smith of Muscatine, Iowa. A liquid-absorbent material may be prepared from such polymer by saponification of the resulting starch-acrylonitrile graft copolymer with a base in an aqueous alcoholic medium. The liquid-absorbent material thus prepared will be satisfactory for use in a variety of liquid-absorbent applications. Such superabsorbent materials are sold by Grain Processing Corporation as the WATER LOCK™ family of superabsorbents. These materials can absorb liquids in an amount of up to several hundred times their own weight.

As further taught in U.S. Pat. No. 4,558,100, issued to Adrian P. Kightlinger, et al., and assigned to Grain Processing Corporation, an improved absorbent composition may be prepared by treating an aqueous mixture of a polynitrile species, such as acrylonitrile or methacrylonitrile, and a poly-functional monomeric cross-linking agent with a polymerization initiator to achieve polymerization and cross-linking of the starch-polynitrile polymer. The resultant cross-linked polymer is then saponified, using an aqueous alcohol solution of an alkali metal base. Further improvements may be realized by using an oxidizing agent, a reducing agent, or a combination of an oxidizing agent and a reducing agent in the manufacture of the starch-polynitrile graft copolymer, as taught in U.S. Pat. No. 4,769,414, issued to Adrian P. Kightlinger et al. and assigned to Grain Processing Corporation.

The prior patents discussed herein provide excellent teachings as to absorbent compositions and methods for their manufacture. The absorbent compositions prepared in accordance with the foregoing teachings may advantageously be used in a variety of superabsorbent applications, such as diapers, protective bed coverings, and so forth. One minor drawback of the prior art compositions, not affecting the utility of these compositions in such applications as described hereinabove, is that, upon absorbing of an aqueous composition, the gelatinoid product thus formed lacks substantial clarity, but rather possesses an occluded or cloudy appearance. While such appearance is of no importance in conventional superabsorbent applications such as diapers and the like, the lack of clarity of the gelatinoid product potentially limits other applications to which the superabsorbent material may be put.

It is a general object of the invention to provide a liquid-absorbent material that forms a substantially clear gelatinoid product, i.e., a gelled or gel-like product, when the liquid-absorbent material is mixed with an aqueous liquid in an amount sufficient to provide such gelatinoid product. It is another general object of the invention to provide a substantially clear gelatinoid product, and further to provide methods for preparing the liquid-absorbent material and gelatinoid product.

SUMMARY OF THE INVENTION

The foregoing objects are achieved in accordance with the invention by providing a saponified starch-polynitrile copolymer that is derived from a derivatized starch. In previously known starch-based superabsorbent materials, a thick-boiling, unmodified starch is used in conjunction with the preparation of saponified starch-polynitride polymer. Surprisingly, it has been found that, when a derivatized starch is used in connection with the preparation of a saponified starch-polynitrile copolymer, and when the product is mixed with a sufficient amount of liquid to form a gelatinoid product, the gelatinoid product thus formed will be substantially clear.

While it is not intended to limit the invention to a particular theory of operation, it is believed that, in prior art starch-based superabsorbent polymers, starch—starch interactions within the polymer, such as retrogradation, aggregation, precipitation, and the like, have led to the formation of solid or semi-solid agglomerates in the gelatinoid product formed upon placing the polymer into absorbent contact with a liquid. The starch—starch interactions are caused by the interactions of starch within and between molecules of the polymer. Such starch—starch agglomerates have an index of refraction that differs from the index of refraction of water. The presence of many such starch—starch agglomerates is believed to have resulted in the cloudy appearance associated with prior art gelatinoid products prepared by placing known superabsorbent materials in absorbent contact with liquid. In contrast, it has surprisingly been found that, in conjunction with the present invention, the use of a derivatized starch is believed to substantially inhibit or prevent such starch—starch interactions in the gelatinoid product, thus providing a substantially clear product.

Thus, in accordance with a preferred embodiment of the invention, the liquid-absorbent starch-polynitrile copolymer is based on a starch that is derivatized to an extent sufficient to substantially inhibit starch—starch interactions in the gelatinoid product. The present invention encompasses such a liquid-absorbent material, and further encompasses a gelatinoid product made by admixing a liquid and the liquid-absorbent material of the invention in a proportion sufficient to form the gelatinoid product. The gelatinoid product of the invention has a number of uses, and may be used, for example, as a carrier in a skin care product or gelatinoid soap. Also encompassed by the present invention are a method for preparing the liquid-absorbent polymer and a method for preparing a gelatinoid product.

Other features and objects of the invention will be apparent from the following description of the invention and the appended claims.

DESCRIPTION OF THE INVENTION

Generally speaking, the superabsorbent material of the invention comprises a copolymer of starch with a polynitrile species, the polynitrile species being polyacrylonitrile, polymethacrylonitrile, or other suitable polymerized nitrile species. In accordance with the invention, the starch is derivatized to a degree sufficient to substantially inhibit starch—starch interactions in the copolymer when the copolymer is placed in contact with liquid to form a gelatinoid mixture. The extent of starch derivatization may be quantitatively characterized by the degree of substitution (DS) of the starch prior to formation of the starch-polynitrile polymer, with starches having a DS of at least about 0.01, and preferably at least about 0.05 being preferred in conjunction with the present invention. Highly preferred starches have a DS in the range of about 0.1 to about 0.15, and the most preferred range is about 0.1 to about 0.12. Starches having a DS higher than 0.15 are believed to provide a satisfactory liquid-absorbent polymer, but may be more expensive than starches having a DS within the preferred ranges. The starch may be derivatized with any suitable substituent, and thus starches such as hydroxyethyl starch, hydroxypropyl starch, and so forth all find utility in conjunction with the present invention. Other known starch derivatization agents include, for example, cationic monomeric halogenated alkyl or alkenyl amines such as 2-diethylaminoethyl chloride hydrochloride; 4-chloro-2-butenyltrimethylammonium chloride hydrochloride; 3-chloro-2-hydroxypropyl-trimethylammonium chloride; phosphates; anhydrides; hypochlorites; propylene oxide; sodium chloracetate or sodium monochloroacetate; and so forth. Further derivatizing agents are disclosed generally in U.S. Pat. No. 4,579,944, issued to Richard D. Harvey and Roger E. McPherson and assigned to Grain Processing Corporation. It is contemplated that any agent capable of derivatizing starch to the requisite DS may be considered useful in connection with the invention.

While it is believed that the use of starches having a DS of at least about 0.01 are useful in connection with the invention because of their tendency to inhibit starch—starch interactions in the gelatinoid product ultimately formed, the invention is known to be operative regardless of the correctness of this theory. Thus, the invention encompasses a liquid absorbent polymer composed of saponified starch-polynitrile polymer, the starch having a DS of at least about 0.01, and preferably in the range of about 0.1–0.15 as described hereinabove. The invention further encompasses a gelatinoid product prepared with such starch-polynitrile polymer, and methods for making the polymer and gelatinoid product.

Most preferred in conjunction with the present invention are thin-boiling starches, that is, starches having a viscosity of about 120 cP or less at 5% solids at 49° C. Thick-boiling starches may also find utility in conjunction with the present invention, but care must be taken during preparation of the starch-polynitrile copolymer that polymerization solids are kept sufficiently low to prevent solidification of the reaction mixture. Starches suitable for use in conjunction with the present include COATMASTER K 592, a thin-boiling hydroxyethyl starch sold by Grain Processing Corporation and having a DS of about 0.08, and PURECOTE® B790, a thin-boiling hydroxypropyl starch sold by Grain Processing Corporation and having a DS of about 0.08.

The invention is not limited to the foregoing embodiments, but, on the contrary, the invention encompasses starch-polynitrile polymers derived from any suitable derivatized starch. The starch used in conjunction with the invention may be obtained from any suitable plant, seed, or grain, and may be thinned by any suitable means or method. Further examples of suitable starches include starches derived from potato, corn, rice, tapioca, wheat, and so forth. Examples of starch-thinning methodologies known in the art include enzymatic treatment, acid thinning, and shear or other mechanical thinning.

In preparing a liquid-absorbent material from the derivatized starch, a copolymer of the starch and a polynitrile species preferably first is prepared. The starch-polynitrile copolymer may itself be made by any suitable technique, such as those taught in the previously discussed U.S. Pat. Nos. 4,769,414 and 4,069,177. Most preferably, the starch-polynitrile copolymer is prepared in accordance with the teachings of U.S. Pat. Nos. 4,558,100 and 4,069,177. As taught therein, the polynitrile species is treated in the presence of a poly-functional monomeric cross-linking agent with a polymerization initiator to achieve polymerization and cross-linking of the acrylonitrile.

The polymerization initiator can be any of the agents known to catalyze the polymerization of acrylonitrile, methacrylonitrile, or other nitrile species. As is known in the art, initiator use levels generally may range from about 0.01 to about 10% by weight based upon the monomer. When the nitrile species is acrylonitrile or methacrylonitrile, suitable polymerization initiators include ceric salts, such as ceric nitrate, ceric sulfate, ceric ammonium nitrate, ceric ammonium sulfate, ceric ammonium pyrophosphate, ceric iodate, ceric salt organic acids, and the like. Ceric compounds which are capable of forming ceric salts in situ also may be used.

Preferably, and as an alternative to the use of ceric salts, the polymerization may be carried out in the presence of a redox catalyst system that incorporates at least an oxidizing catalyst or initiator, and preferably also a reducing catalyst. Suitable oxidizing catalysts include organic peroxides, inorganic persulfates, inorganic perdisulfates, peroxides, percarbonates, perborates, chlorates, and the like. Representative oxidizing catalysts include hydrogen peroxide, sodium peroxide, potassium persulfate, sodium perborate, potassium perborate, and ammonium persulfate, with ammonium persulfate being the preferred catalyst. The oxidizing catalyst preferably is present in the reaction mixture in an amount of from about 0.25% to about 1.5% by weight.

Reducing catalysts suitable for use in conjunction with the invention include species such as hydrosulfite, metabisulfate, bisulfite, thiosulfite, formaldehyde bisulfite, formaldehyde sulfoxylate or other sulfoxy compounds. Examples of specific catalysts include sodium hydrosulfite, sodium metabisulfite, sodium bisulfite, sodium biosulfite, sodium formaldehyde bisulfite, sodium formaldehyde sulfoxylate, and mixtures thereof. If a reducing agent is used in conjunction with the oxidizing agent catalyst, it is generally used in an amount equivalent to the molar amount of the oxidizing agent.

The catalyst system may further include a promoter, in the form of a multivalent metal ion. Suitable promoters include, for example, the ions of iron, throrium, vanadium, nickel, chromium, copper, and cobalt. These promoters are usually added to the reaction mixture in the form of a water-soluble salt. The preferred promoter is ferrous iron, which preferably is present in the form of ferrous ammonium sulfate.

Most preferably, the catalyst system comprises a mixture of ammonium persulfate, sodium metabisulfite, and ferrous ammonium sulfate. Preferably, the ammonium persulfate is present in the reaction mixture in an amount ranging from about 0.05 to 1.0% by weight; sodium metabisulfite is present in an amount ranging from about 0.04 to 0.85% by weight; and ferrous ammonium sulfate is used in an amount ranging from about 0.005 to about 0.05% by weight.

In the starch-polynitrile copolymer, it is desired that the ratio of starch:polynitrile polymer range from about 1:0.1 to about 1:X, X being a number less than 20, and preferably being no more than 9. A preferred range of starch to polynitrile in the polymer is about 1:0.1 to about 1:9. To produce a copolymer of starch and the polynitrile species having components present in this ratio, starch is preferably incorporated into the reaction mixture in an amount ranging from about 20% to about 300% by weight based on the weight of the nitrile species in the reaction mixtures.

To achieve cross-polymerization and cross-linking of the starch-polynitrile copolymer, a poly-functional cross-linking agent preferably is used in combination with acrylonitrile during the graft copolymerization step. Preferred cross-linking agents include agents containing at least two terminal polymerizable ethylenic groups per molecule. Examples of such cross-linking agents include N,N'-methylene-bis-acrylamide, N,N'-methylene-bis-methacrylamide, diallyl amine, diallyl acrylamide, diallyl methacrylamide, diallyl ether, diallyl methyl ether, divinyl benzene, diethylene glycol divinyl ether, ethylene glycol diacrylate, propylene glycol diacrylate, propylene glycol dimethacrylate, diethylene glycol diacrylate, diethyleneglycol dimethacrylate, tetraethylene glycol dimethacrylate, allyl acrylate, allyl methacrylate, trimethylolpropane triacrylate, trimethylolpropane trimethacrylate, 1,6-hexanediol diacrylate, pentacrythritol triarcrylate, glyceryl/propoxy triacrylate, and the like. The preferred cross-linking agent is N,N-methylene-bis-acrylamide monomer. When this agent is incorporated into the reaction mixture, the resulting polymer will be cross-linked with bridges derived from this agent.

The level of cross-linking agent may be varied to suit specific requirements, Typically, the cross-linking agent is present in an amount ranging from about 0.03% to about 5.0% by weight based on monomer. Preferably the cross-linking agent is present in an amount ranging from about 0.05% to 2.0% by weight on monomer. The cross-linking monomer can be added before the polymerization is initiated, at the end of the exotherm following the initiation of the polymerization, or at both times. The cross-linking agent can also be added continuously throughout the polymerization.

In certain instances, and as a further optional embodiment, the addition of a surfactant to the polymerization mix prior to initiation of polymerization provides improved results, such as increased reaction efficiencies, reduced coagulum, and improved absorption characteristics. Anionic surfactants suitable for use in conjunction with the invention include, for example, alkyl sulfates, alkyl aryl sulfonates such as alkyl benzene sulfonate, monoglyceride sulfates, sulfoethyl oleates, sulfoethyl-N-methyl oleic amides, fatty acid soaps such as sodium stearate, and the like. Suitable nonionic surfactants include polyglycol ether-type surfactants; polyalkylene oxide derivatives of phenolic compounds such as dibutyl and diamyl phenols and cresols, heptyl, octyl, nonyl, decyl phenols and cresols; polyalkylene oxide derivatives of aliphatic organic hydroxy compounds and carboxy compounds; polyalkylene oxide derivatives of carboxylic acid amides and of sulfoamides, and the like. Representative surfactants include AEROSOL 22 (tetrasodium-N-(1,2 dicarboxyethyl)-N-octadecyl sulfosuc-cinamate; American Cyanamide Co., Wayne, N.J.), SPAN 20 (sorbitan monolaurate; ICI Americas, Inc., Wilmington, Del.); SPAN 40 (sorbitan monopalmitate; ICI Americas, Inc., Wilmington, Del.), SPAN 60 (sorbitan monooleate; ICI Americas, Inc., Wilmington, Del.), and SIPEX EST-30 (sodium tridecyl ether sulfate; Alcolac, Inc., Baltimore, Md.), and AEROSURF TA-100 (distearyl methyl ammonium chloride; Scherex Corporation). Preferred surfactants include AEROSOL 22 and SIPEX EST-30. As known in the art, surfactant use levels will vary depending upon the type of surfactant employed and the end use of the resultant superabsorbent. The surfactant may be employed in an amount ranging from about 0.1% to about 10.0%, and preferably about 0.25% to about 6.0% by weight based upon monomer.

After preparation of the starch-polynitrile polymer, the next step in the preparation of a liquid-absorbent material is saponification of the starch-polynitrile polymer. Any suitable saponification method may be employed in conjunction with the present invention. Conventionally, a water-soluble alcohol, such as methanol, ethanol, isopropanol, propanol, or the like is used with a base such as sodium hydroxide, potassium hydroxide, lithium hydroxide, calcium hydroxide, or the like. Specific ingredients used in connection with the saponification reaction, the amounts of those ingredients, and other reaction conditions employed in conjunction with the invention may be conventional, and may be as taught in U.S. Pat. No. 4,558,100. The saponified product thus prepared may be recovered in an anhydrous solvent such as anhydrous methanol, then filtered and dried to yield a granular, substantially water insoluble product.

The liquid-absorbent polymer thus prepared is suitable for use in a great variety of superabsorbent applications, such as diapers and the like. The liquid-absorbent polymer is also useful in a gelatinoid form. To prepare a gelatinoid product, the liquid-absorbent polymer is placed into liquid-absorbent contact with water, aqueous liquids, or other suitable liquid medium in proportions effective to provide a product of a gelatinoid nature, i.e., a product in gelatinous or gel-like form suitable for use in applications where a gelatinous product may be employed. While it is believed that water or other aqueous media are preferred liquids for use in the preparation of gelatinoid product, it is contemplated that other liquids may be so used. The liquid-absorbent polymer preferably is capable of absorbing many times its own weight of liquid, although as is known in the art, the amount of liquid that the polymer will be capable of absorbing may vary widely. Preferably, the water-absorbent polymer may absorb liquid in an amount ranging from about 100% to about 70,000% by weight of the polymer, although, in conjunction with the invention, the specified amount of liquid that the polymer is capable of absorbing is not critical.

The gelatinoid product thus prepared will be substantially clear, that is, it will have a substantially homogeneous or homogeneous index of refraction such that the product is non-cloudy and free or substantially free of occluded regions. As indicated above, the water-absorbent polymers of the prior art yield gelatinoid products that have a cloudy appearance, which is believed to be due to the presence of starch—starch agglomerates in the product. In accordance with the invention, the gelatinoid product is substantially clear, that is, the appearance of the product is clear relative to the product provided by placing the polymers of the prior art into absorbent contact with a liquid. Most preferably, the gelatinoid product of the invention has a uniform index of refraction, such that light scattering within the product is avoided. In preferred embodiments of the invention, the product is also substantially colorless.

The gelatinoid product of the invention has a number of uses. For example, it may be used in any instance where a product of a gelatinoid nature is desired, such as in a bicycle seat, shoe sole, thermal pack such as an ice pack, and so forth. The gelatinoid product also may be used as a carrier for or in another product. For example, a gelatinoid soap, such as a shampoo, may comprise the gelatinoid product of the invention and a cleansing agent, such as sodium lauryl sulfate, the cleaning agent being present in an amount sufficient to clean a substrate. As another example, the product may be a fragrance product that comprises the gelatinoid product of the invention and an amount of a fragrance effective to impart a fragrant nature to a substrate such as skin. Other products wherein the invention may find utility include, for example, cleansing agents, skin creams, and skin lotions. The selection of specific ingredients and of processing steps for preparation of such products as shampoos and soaps will vary depending on the specific application.

The following examples further illustrate the invention, but should not be construed as limiting the scope of the invention.

COMPARATIVE EXAMPLE 1

GELATINOID PRODUCT PREPARED WITH PEARL STARCH

This example illustrates the preparation of a superabsorbent copolymer and of a gelatinoid product.

A. Preparation of StarchPoly-acrylonitrile Copolymer (S-PAN)

To a five liter round-bottom reaction flask equipped with an agitator, a reflux condenser, and a thermometer were added, with agitation, 3,300 grams deionized (DI) water, 20.0 grams SIPEX EST-30 surfactant, 5 mL ferrous ammonium sulfate (FAS) solution (comprising 0.96 grams FAS·6H$_2$O dissolved in 100 mL water containing 3 mL of 1:1 HCl) and 441 grams (400 grams dry basis) granular pearl starch. The mixture was heated to 35° C., and during the step of heating to this temperature, 0.752 grams N,N'-methylene bisacrylamide were added, followed by 400 grams acrylonitrile over about 10–15 minutes. The reaction mixture was allowed to stir for 5 minutes. With the temperature at 35° C., 0.94 grams sodium metabisulfate dissolved in 15 mL of water were added, followed immediately by 1.12 grams ammonium persulfate dissolved in 15 mL of water.

Upon addition of the sodium metabisulfate and ammonium persulfate, polymerization initiated within about 2 minutes, as indicated by a rise in temperature. When the reaction temperature reached 60° C., the mixture was held for 60 minutes. At the end of the 60 minute period, 0.5 grams of sodium metabisulfate were added, followed by 0.5 grams of ammonium persulfate. The mixture was then held for another 30 minutes, then cooled to room temperature, transferred to a 4L Nalgene beaker, covered with a watch glass, and sealed with ammonium foil.

B. Saponification of the S-PAN

To a one-gallon stainless steel Chemineer pressure reactor were added, with agitation, 1250 grams of the S-PAN from step A, 1848 mL MeOH, 252 grams water, and 432 grams of 50% NaOH solution. The reactor was sealed, heated to 100° C., and held for 90 minutes. At the end of the 90 minute period, the reactor was cooled to 30°–35° C. and transferred to a 4L Nalgene beaker. The saponified product was recovered in methanol using a decant washing technique until the supernatant specific gravity was 0.78 to 0.80, the pH being adjusted to 7.5 to 7.7 with HCl. To the mixture was added 4.8 grams of AROSURF TA-100. The product was filtered on a Buchner funnel using Whatman # 1 filter paper and a rubber dam and then dried in a 60° C. vacuum oven. The product was then passed through a 20 mesh sieve.

The resulting polymer had excellent water absorbency and 1% NaCl absorbency, and was suitable for use as a superabsorbent material.

C. Preparation of Gelatinoid Product

To 0.25 grams of the saponified polymer prepared in accordance with step B were added 50 mL of water to thereby form a gelatinoid dispersion of the superabsorbent polymer in water. The resultant gelatinoid product did not have a homogeneous index of refraction, as was evident from the cloudy nature of the product.

EXAMPLE 1

PREPARATION OF A GELATINOID PRODUCT

This example illustrates the preparation of a substantially clear gelatinoid product from a liquid-absorbent polymer, the polymer comprising a graft copolymer of a thin-boiling hydroxyethyl starch with polyacrylonitrile.

A. Preparation of S-PAN.

The teachings of Comparative Example 1 were followed, except that, instead of using pearl starch to prepare the S-PAN, a thin-boiling hydroxyethyl starch, COATMASTER K592, was used. Graft polymerization initiated within 30 seconds after the addition of the sodium metabisulfite solution (3.0 g in 30 mL water) and the ammonium persulfate solution (3.5 g in 30 mL water). The ensuing exothermic reaction caused the reaction temperature to rise to the 60° hold temperature within seven minutes. After the 60 minute-hold time, 0.7 grams each of sodium metabisulfite and ammonium persulfate were added, and the reaction was held another 30 minutes and then cooled to room temperature.

B. Saponification of the S-PAN

The S-PAN prepared as above was conducted as set forth in Comparative Example 1. The S-PAN solids in the saponification were reduced from 7.0 to 5.75% as a result of the lower solids content in the starch graft polymerization as compared with that of Comparative Example 1.

Water absorbency and absorbency of a 1% NaCl solution were comparable to that of comparative example 1.

C. Preparation of a Gelatinoid Product

A dispersion of 0.25 grams of the product prepared in accordance with Section B in 50 mL of water was prepared. The gelatinoid product thus produced had a substantially homogeneous index of refraction, and was substantially clear, as visually determined relative to the product of Comparative Example 1.

EXAMPLE 2

PREPARATION OF A CLEAR GELATINOID PRODUCT

This example illustrates the preparation of a clear gelatinoid product from a copolymer of a thin-boiling hydroxypropyl starch with acrylonitrile.

A gelatinoid product was prepared in accordance with the method of Example 1, except that a thin-boiling hydroxypropyl starch, PURECOTE® B790 was used to prepare the S-PAN. Water and 1% NaCl absorbency values for the saponified S-PAN were comparable to those of the saponified product of Comparative Example 1. A dispersion of 0.25 grams of the saponified product in 50 mL of water gave a substantially clear gelatinoid product relative to that of Comparative Example 1.

EXAMPLE 3

PREPARATION OF A GELATINOID PRODUCT

This example illustrates an example of preparation of a gelatinoid product in which the starch:acrylonitrile ratio was increased to 1:2 in the polymer.

Example 1 was repeated to prepare a saponified polymer, except that in step A, 800 grams of acrylonitrile were added to the starch. Water and 1% NaCl absorbency values of the saponified S-PAN were comparable to those of Comparative Example 1, and a dispersion of 0.25 grams of the saponified product in 50 mL of water gave a very clear gel relative to that of Comparative Example 1.

EXAMPLE 4

PREPARATION OF A GELATINOID PRODUCT

This example illustrates the preparation of a gelatinoid product based on a hydroxypropyl starch:acrylonitrile polymer wherein the starch:acrylonitrile ratio is 1:2.

Example 3 was repeated using a thin-boiling hydroxypropyl starch. Water and 1% NaCl absorbency values for the saponified S-PAN were substantially improved over those of Example 2 (hydroxypropyl starch:polyacrylonitrile in 1:1 ratio), and a dispersion of 0.25 g of the saponified S-PAN in 50 mL water gave a very clear gel relative to that of Comparative Example 1.

COMPARATIVE EXAMPLE 2

Example 2 was repeated, using a thick-boiling derivatized starch at high polymerization solids. During formation of the starch-polyacrylate polymer, the reaction mixture turned semi-solid and was discarded.

EXAMPLE 5

Comparative Example 2 is repeated, except that the polymerization solids are reduced by adding water to the reaction mixture. A substantially clear gelatinoid product is formed.

EXAMPLE 6

PREPARATION OF A GELATINOID PRODUCT

A gelatinoid product is prepared in accordance with Example 1, except that ceric ammonium nitrate is used to catalyze the reaction. For preparing the S-PAN, a solution of 7.7 g of ceric ammonium nitrate dissolved in 4.7 mL concentrated nitric acid and 17 mL water is added to the reaction flask in Step A prior to addition of the acrylonitrile. After the 60° exotherm, the reaction is held for 90 minutes, then cooled to room temperature and covered and sealed. Upon saponification of the S-PAN and admixture of the saponified S-PAN with water, a substantially clear gelatinoid product is formed.

While particular embodiments of the invention have been shown, it will be understood that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention. All references cited herein are hereby incorporated by reference in their entireties.

What is claimed is:

1. A method for preparing a liquid-absorbent polymer, the method comprising the steps of:

providing a copolymer of starch and a polynitrile species; and saponifying said copolymer to provide a liquid-absorbent polymer;

wherein said starch is a derivatized starch having a degree of substitution sufficient to substantially inhibit starch—starch interactions in said liquid-absorbent polymer when said liquid-absorbent polymer is placed into absorbent contact with a liquid.

2. A method according to claim 1, wherein said polynitrile species is selected from the group consisting of polyacrylonitrile and polymethacrylonitrile.

3. A method according to claim 1, wherein said copolymer is a graft copolymer prepared by a method including the steps of:

providing said starch; and adding a nitrile species to said starch in the presence of a catalyst system, whereby said nitrile species graft-polymerizes with said starch to form a copolymer of starch with said polynitrile species.

4. A method according to claim 3, wherein said redox catalyst system includes an oxidizing agent selected from the group consisting of hydrogen peroxide; sodium peroxide; potassium monosulfate; potassium persulfate; sodium perborate; potassium perborate; and ammonium persulfate.

5. A method according to claim 4, wherein said catalyst comprises ammonium persulfate.

6. A method according to claim 4, wherein said catalyst system further includes a reducing agent selected from the group consisting of sodium hydrosulfite; sodium metabisulfite; sodium bisulfite; sodium thiosulfite; sodium formaldehyde bisulfite; sodium formaldehyde sulfoxylate; and mixtures thereof.

7. A method according to claim 6, wherein said catalyst system further includes a multivalent metal ion.

8. A method according to claim 7, wherein said metal ion comprises ferrous iron, said ferrous iron being present in the form of ferrous ammonium sulfate.

9. A method according to claim 3, wherein said catalyst system comprises a mixture of sodium metabisulfite; ferrous ammonium sulfate; and ammonium persulfate.

10. A method according to claim 3, wherein said catalyst system includes a ceric salt.

11. A method according to claim 10, wherein said salt comprises ceric ammonium nitrate.

12. A method according to claim 3, wherein said polymerization is conducted in the presence of a cross-linking species to thereby form a cross-linked copolymer.

13. A method according to claim 12 wherein said cross-linking species includes a polyfunctional monomeric cross-linking agent containing at least two polymerizable ethylenic groups per molecule.

14. A method according to claim 13, wherein said cross-linking species is incorporated into said reaction mixture under one of the following reaction conditions (1), (2), or (3): (1) prior to initiation of polymerization of the polynitrile species; (2) continuously during polymerization of the polynitrile species; or (3) subsequent to the initiation of the polynitrile species.

15. A method according to claim 14, wherein said cross-linking species comprises N,N'-methylene-bis-acrylamide.

16. A method according to claim 1, wherein said starch has a DS of at least about 0.01.

17. A method according to claim 16, wherein said starch has a DS of at least about 0.05.

18. A method according to claim 16, wherein said starch has a DS ranging from about 0.1 to about 0.15.

19. A method according to claim 18, wherein said starch has a DS ranging from about 0.1 to about 0.12.

20. A method according to claim 1, wherein said starch is selected from the group consisting of hydroxyethyl starch and hydroxypropyl starch.

21. A method according to claim 1, wherein the ratio of starch:polynitrile species in said copolymer ranges from 1:0.1 to 1:X, X being a number less than 20.

22. A method according to claim 21, wherein the ratio of starch:polynitrile species in said copolymer ranges from about 1:0.1 to about 1:9.

23. A method for preparing a gelatinoid product, comprising the step of placing the product formed by the method of claim 1 into absorbent contact with a liquid in a proportion sufficient to form a gelatinoid product.

24. A method according to claim 23, wherein said liquid is an aqueous liquid.

25. A liquid-absorbent polymer comprising a saponified graft copolymer of starch and a polynitrile species, said starch comprising a derivatized starch having a degree of substitution sufficient to substantially inhibit starch—starch interactions in said polymer when said polymer is placed into absorbent contact with a liquid.

26. A polymer according to claim 25, wherein said polymer is cross-linked via cross-linking bridges derived from N,N'-methylene-bis-acrylamide monomer.

27. A polymer according to claim 25, wherein said starch has a DS of at least about 0.01.

28. A polymer according to claim 27, wherein said starch has a DS of at least about 0.05.

29. A polymer according to claim 27, wherein said starch has a DS ranging from about 0.1 to about 0.15.

30. A polymer according to claim 29, wherein said starch has a DS ranging from about 0.1 to about 0.12.

31. A polymer according to claim 25, wherein said starch is selected from the group consisting of hydroxyethyl starch and hydroxypropyl starch.

32. A polymer according to claim 25, wherein the ratio of starch:polynitrile species in said copolymer ranges from 1:0.1 to 1:X, X being a number less than 20.

33. A polymer according to claim 32, wherein the ratio of starch:polynitrile species in said copolymer ranges from about 1:0.1 to about 1:9.

34. A substantially clear gelatinoid product comprising a liquid in absorbent contact with a liquid-absorbent polymer, the liquid-absorbent polymer comprising a saponified graft copolymer of starch and a polynitrile polymer, said starch comprising a derivatized starch having a degree of substitution sufficient to substantially inhibit starch—starch interactions in said liquid-absorbent polymer in said gelatinoid product; said liquid being in absorbent contact with said liquid-absorbent polymer in said gelatinoid product in an amount effective to impart a gelatinoid nature to said product.

35. A product according to claim 34, wherein said liquid is present in said product in an amount ranging from about 100% to about 70000% by weight of said absorbent polymer.

36. A product according to claim 34, wherein said polymer is cross-linked via cross-linking bridges derived from N,N'-methylene-bis-acrylamide monomer.

37. A product according to claim 34, wherein said starch has a DS of at least about 0.01.

38. A product according to claim 37, wherein said starch has a DS of at least about 0.05.

39. A product according to claim 37, wherein said starch has a DS ranging from about 0.1 to about 0.15.

40. A product according to claim 39, wherein said starch has a DS ranging from about 0.1 to about 0.12.

41. A product according to claim 34, wherein said starch is selected from the group consisting of hydroxyethyl starch and hydroxypropyl starch.

42. A product according to claim 34, wherein the ratio of starch:polynitrile species in said copolymer ranges from 1:0.1 to 1:X, X being a number less than 20.

43. A product according to claim 42, wherein the ratio of starch:polynitrile species in said copolymer ranges from about 1:0.1 to about 1:9.

44. A gelatinoid soap comprising the gelatinoid product of claim 34 and an amount of a cleansing agent sufficient to clean a substrate.

45. A liquid-absorbent polymer comprising a saponified graft copolymer of starch and a polynitrile species, said starch comprising a derivatized starch having a degree of substitution of at least about 0.01.

46. A liquid absorbent polymer according to claim 45, wherein said starch had a DS ranging from about 0.1 to about 0.15.

47. A liquid absorbent polymer according to claim 47, wherein said starch has a DS ranging from about 0.1 to about 0.12.

48. A gelatinoid product comprising the liquid-absorbent polymer of claim 45 in absorbent contact with a liquid, said polymer and said liquid being present in said product in a proportion sufficient to impart a gelatinoid nature to said product.

* * * * *

UNITED STATES PATENT AND TRADEMARK OFFICE
CERTIFICATE OF CORRECTION

PATENT NO. : 5,886,124
DATED : March 23, 1999
INVENTOR(S) : Kightlinger et al.

It is certified that error appears in the above-identified patent and that said Letters Patent is hereby corrected as shown below:

Column 7, line 46: "StarchPoly-acrylotrile" should read -- Starch-Polyacrylonitrile --.

Signed and Sealed this

Fifth Day of October, 1999

Attest:

Q. TODD DICKINSON

Attesting Officer

Acting Commissioner of Patents and Trademarks